US009769738B2

(12) United States Patent
Guo

(10) Patent No.: US 9,769,738 B2
(45) Date of Patent: Sep. 19, 2017

(54) IMPLEMENTING AN ACCESS CONTROLLER POOL

(71) Applicant: Hangzhou H3C Technologies Co., Ltd., Hangzhou (CN)

(72) Inventor: Weiwei Guo, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/893,399

(22) PCT Filed: Feb. 21, 2014

(86) PCT No.: PCT/CN2014/072345
§ 371 (c)(1),
(2) Date: Nov. 23, 2015

(87) PCT Pub. No.: WO2015/003500
PCT Pub. Date: Jan. 15, 2015

(65) Prior Publication Data
US 2016/0165523 A1 Jun. 9, 2016

(30) Foreign Application Priority Data

Jul. 9, 2013 (CN) .......................... 2013 1 0286974

(51) Int. Cl.
H04L 12/50 (2006.01)
H04W 48/16 (2009.01)
H04L 12/64 (2006.01)
H04L 29/12 (2006.01)
H04W 4/06 (2009.01)

(52) U.S. Cl.
CPC ......... *H04W 48/16* (2013.01); *H04L 12/6418* (2013.01); *H04L 61/6022* (2013.01); *H04W 4/06* (2013.01)

(58) Field of Classification Search
CPC ........................................................ H04W 4/06
(Continued)

(56) References Cited

U.S. PATENT DOCUMENTS 7,450,940 B2 11/2008 Myers et al.
8,099,096 B2 1/2012 Prakash et al.
(Continued)

FOREIGN PATENT DOCUMENTS

CN 101815365 8/2010
CN 103024798 4/2013

OTHER PUBLICATIONS

International Search Report and Written Opinion dated May 23, 2014 issued on PCT/CN2014/072345 dated Feb. 21, 2014, ISA/CN.
(Continued)

*Primary Examiner* — Dang Ton
(74) *Attorney, Agent, or Firm* — Hewlett Packard Enterprise Patent Department

(57) ABSTRACT

According to an example, in an AC pool including a MAC and a plurality of LACs registered on the MAC, after a first LAC is registered on the MAC, the MAC issues a first traffic rule to the first LAC, wherein the first traffic rule redirects a discovery packet sent from an AP to the MAC. When receiving the discovery packet sent from the AP or receiving a discovery packet sent from the AP and forwarded via a LAC, the MAC selects, from a plurality of the LACs, a second LAC for handling the AP. The MAC generates a second traffic rule associated with the AP and the second LAC, and issue the second traffic rule to a plurality of the LACs, so that when another LAC receives a communication tunnel protocol packet sent from the AP, the other LAC redirects the communication tunnel protocol packet to the second LAC.

20 Claims, 9 Drawing Sheets

(58) Field of Classification Search
USPC .......................................................... 370/329
See application file for complete search history.

(56) References Cited

U.S. PATENT DOCUMENTS

| 2010/0121975 A1* | 5/2010 | Sinha ................... H04L 65/103 |
| | | 709/231 |
| 2012/0259992 A1 | 10/2012 | Koehler et al. |
| 2012/0260120 A1 | 10/2012 | Mongeau et al. |

OTHER PUBLICATIONS

Wang, et al., English Abstract of "Investigation of operation level WIFI network architecture", China New Telecom, May 31, 2012.
Papanikos, Ioannis and Logothetis, Michael, "A Study on Dynamic Load Balance for IEEE 802.11b Wireless LAN", EESC, Univ. of California, Berkely, Feb. 18, 2002.
Zhang, Partial English translation of "Bin Investigation of AC resource pool in WLAN network construction", China New Telecom, Sep. 30, 2012.
Calhoun P., et al.. "Control and Provisioning of Wreless Access Point (CAPWAP), Protocol Specification", Network Working Group, Request for Comments: 5415, Standards Track, Mar. 2009, pp. 1-155.
IEEE 802.1ag 2007, IEEE Standard for Local and Metropolitan Area Networks, Virtual Bridged Local Area Networks, Amendment 5: Connectivity Fault Management, IEEE Computer Society, New York, United States of America, Date: Dec. 17, 2007, pp. 1-246.

\* cited by examiner

IMPLEMENTING AN ACCESS CONTROLLER POOL

CLAIM FOR PRIORITY

The present application is a national stage filing under 35 U.S.C. §371 of PCT application number PCT/CN2014/072345, having an international filing date of Feb. 21, 2014, which claims priority to Chinese patent application number 201310286974.6, having a filing date of Jul. 9, 2013, the disclosures of which are hereby incorporated by reference in their entireties.

BACKGROUND

Access controllers (ACs) may employ multilevel architecture in an AC hierarchy solution. According to AC-access point (AP) architecture, an AP is connected to a fixed AC. The ACs may be deployed based on areas, in other words, each AC may manage APs within a fixed area.

BRIEF DESCRIPTION OF THE DRAWINGS

Features of the present disclosure are illustrated by way of example and not limited in the following figure(s), in which like numerals indicate like elements, in which.

DETAILED DESCRIPTION

Hereinafter, the present disclosure will be described in further detail with reference to the accompanying drawings and examples to make the technical solution and merits therein clearer.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, and the term "including" means including but not limited to. The term "based on" means based at least in part on. In addition, the terms "a" and "an" are intended to denote at least one of a particular element.

With development of construction of a wireless city, hundreds of ACs may be deployed in the city. As such, maintenance of a core network and resource utilization efficiency become a great matter. As development of a wireless local area network (WLAN) service is unbalanced, imbalance between AC capacities and link load may often appears in an actual network. In addition, link resources and capacity resources between different ACs may not be shared, which may result in a waste of resources.

According to various examples of the present disclosure, a master AC (MAC) and a local AC (LAC) in the AC hierarchy architecture may join in a same resource pool, which may be called an AC pool. All of ACs in the AC pool, including the MAC and the LAC, share a same internet protocol (IP) address. The AC pool may be presented as a virtual AC to the external. All of APs and wireless stations (STAs) may share hardware and software resources in the AC pool.

Figure 1:
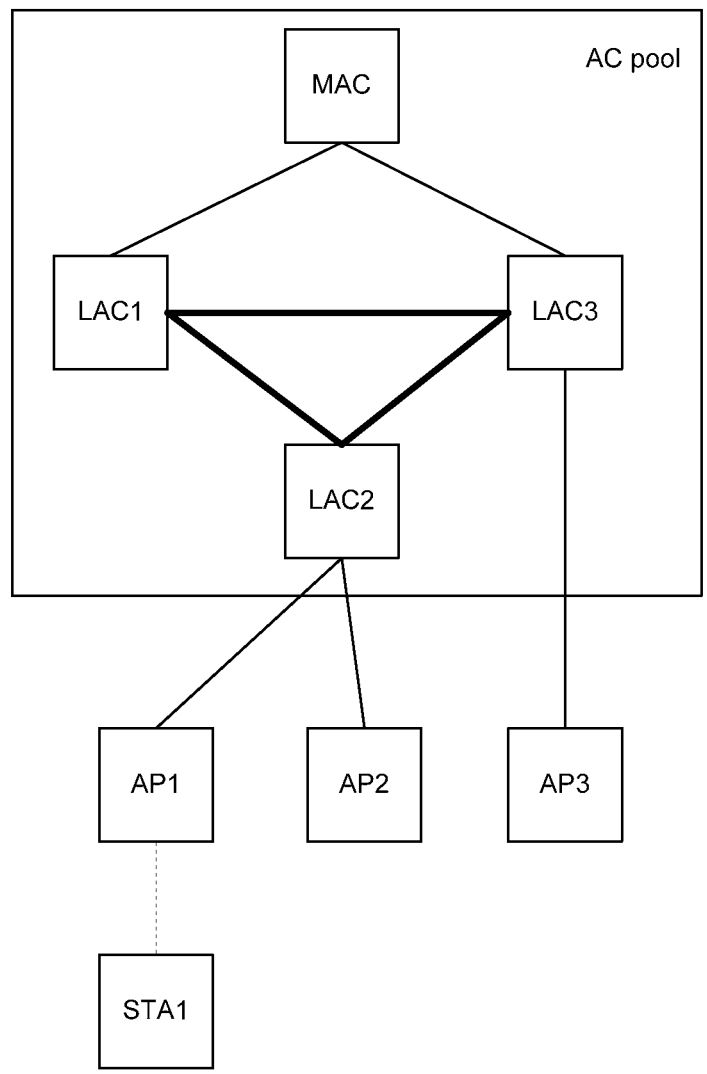
FIG. 1 is a schematic diagram illustrating a network of an AC pool, according to an example of the present disclosure.

FIG. 1 is a schematic diagram illustrating a network of an AC pool, according to an example of the present disclosure. As shown in FIG. 1, the AC pool may consist of one MAC and three LACs including LAC1, LAC2, and LAC3. In this case, the MAC, LAC1, LAC2, and LAC3 may share a same IP address. The LAC1, LAC2, and LAC3 are depicted as being connected to each other. The greater the bandwidth of a direct link between LACs is, the better the direct link is. The MAC may be directly connected to at least one of the three LACs. According to an example of the present disclosure, packets between the MAC and a LAC that is not directly connected to the MAC may be forwarded by a LAC that is directly connected to the MAC.

According to various examples of the present disclosure, the MAC in the AC pool may manage a plurality of LACs in the AC pool, while the LAC in the AC pool may be responsible for managing the AP and STA. Hereinafter, implementation of the AC pool may be described in further detail.

All of LACs Join the AC Pool

According to various examples of the present disclosure, initially, the MAC may join the AC pool by default. A LAC may join the AC pool through registering on the MAC. A specific process may be implemented as follows.

The MAC may periodically broadcast an AC pool basic information packet, which may include information about the AC pool (e.g., a name of the AC pool, an identifier of the AC pool, etc.) and information about the MAC (e.g., a media access control (MAC) address of the MAC). When receiving the AC pool basic information packet, the LAC may send a packet requesting to join the AC pool to the MAC. When receiving the packet requesting to join the AC pool sent from the LAC, the MAC may determine, based on a pre-configured allowed-AC list (which may include information about all of LACs that may be allowed to join the AC pool), whether the LAC is allowed to join the AC pool. In response to a determination that the LAC is allowed to join the AC pool, information about the LAC may be registered on the MAC. Otherwise, a reject packet may be returned to the LAC.

According to an example of the present disclosure, a way for registering the information about the LAC on the MAC may be defined to add the information about the LAC in a list of ACs accessing the AC pool.

It may be noted that after the MAC and all of the LACs in the AC hierarchy architecture have joined the AC pool and the AC pool works properly, the AC pool may be expanded, so that a new LAC may join the AC pool. A way for joining the AC pool may be implemented as follows. When receiving the AC pool basic information packet that is periodically sent from the MAC, the new LAC may send a packet requesting to join the AC pool to the MAC. When receiving the packet requesting to join the AC pool sent from the new LAC, the MAC may determine, based on the pre-configured allowed-AC list and information about the new LAC carried in the packet requesting to join the AC pool, that the new LAC is allowed to join the AC pool. The information about the new LAC may be registered in the MAC, so that the new LAC may successfully join the AC pool and may manage the AP and the STA under control of the MAC. It may be noted that the new LAC may be directly connected to each LAC that has already joined the AC pool, so that all of the LACs in the AC pool may be connected to each other.

Management Functions of the AC Pool to the AP

According to various examples of the present disclosure, an AP may initiate a connection to the AC pool through sending a discovery packet to the AC pool. The MAC in the AC pool may process the discovery packet sent from the AP. The MAC may assign a LAC for handling the AP and return a response packet. According to various examples of the present disclosure, the LAC handling the AP may referred to as a handling LAC of the AP. When a LAC in the AC pool receives the discovery packet sent from the AP, the LAC may redirect the discovery packet to the MAC, in other words, the discovery packet may be re-sent to the MAC by force.

In this case, the MAC may pre-configure a first traffic rule, which may redirect the discovery packet sent from the AP to the MAC. When a LAC is registered on the MAC, the MAC may issue the first traffic rule to the LAC. As such, when the LAC receives the discovery packet sent from the AP, the LAC may redirect the discovery packet to the MAC based on the first traffic rule. According to an example of the present disclosure, each LAC may associated with a first traffic rule, and the number of the first traffic rules may be equal to the total number of the LACs in the AC pool.

According to an example of the present disclosure, after receiving a discovery packet sent from an AP, the MAC may assign a handling LAC for the AP. The handling LAC may manage the AP in some aspects including join control, configuration issuing, version upgrading, heartbeat detection, and so like.

According to an example of the present disclosure, based on a principle of making full use of resources, the MAC may assign the handling LAC for the AP according to at least three methods described as follows.

In a first method, APs belonging to a same hotspot may be distributed on a same LAC. In this case, a hotspot to which each AP belongs may be pre-configured in the MAC. When receiving the discovery packet sent from the AP, the MAC may determine a hotspot to which the AP belongs and determine whether there is another AP that accesses the AC pool and belongs to the hotspot. When there is the other AP that accesses the AC pool and belongs to the hotspot, the MAC may configure a handling LAC of the other AP as the handling LAC of the AP. When there is not the other AP that accesses the AC pool and belongs to the hotspot, the MAC may configure a LAC which the AP physically accesses as the handling LAC of the AP. According to another example of the present disclosure, when there is not the other AP that accesses the AC pool and belongs to the hotspot, the MAC may configure a LAC in the AC pool that handles the smallest number of APs as the handling LAC of the AP. Employing the first method, when a STA roams within a same hotspot, a roaming operation may be completed in a handling LAC of an AP with which the STA is associated, so that roaming performance may be improved.

In a second method, a LAC which the AP physically accesses may be directly configured as the handling LAC of the AP. In this case, after receiving the discovery packet sent from the AP, the MAC may determine a LAC to which the AP is directly connected. The MAC may select the LAC to which the AP is directly connected as the handling LAC of the AP. When the second method is employed, traffic pressures on an interconnecting network between LACs may be reduced.

In a third method, based on a current real-time pressure of each LAC, a LAC in the AC pool that handles the smallest number of APs may be directly configured as the handling LAC of the AP. In this case, when receiving the discovery packet sent from the AP, the MAC may determine the number of APs handled by each LAC, and may select the LAC which handles the smallest number of APs as the handling LAC of the AP. When the third method is employed, load of each LAC may be balanced.

After the MAC assigns the handling LAC for the AP, traffic from the AP may be forwarded by the handling LAC. As such, when the MAC receives the discovery packet sent from the AP and determines the handling LAC of the AP, the MAC may generate a second traffic rule associated with the AP and the handling LAC of the AP, and notify the second traffic rule to all of the LACs in the AC pool. As such, another LAC may redirect the traffic from the AP to the handling LAC of the AP for forwarding. According to an example of the present disclosure, each AP may associated with a second traffic rule, and the number of the second traffic rules may be equal to the total number of APs supported by the AC pool. The second traffic rule may redirect a communication tunnel protocol packet from the AP to the handling LAC of the AP. The second traffic rule may include interface information of the AP and information about the handling LAC of the AP, in which the interface information of the AP may include an IP address and a port number of the AP. Thereafter, when a LAC in the AC pool receives a communication tunnel protocol packet of which a source IP address and a source port number may respectively be the IP address and the port number of the AP, the LAC may search out the second traffic rule and redirect, based on the second traffic rule, the communication tunnel protocol packet from the AP to the handling LAC of the AP. According to an example of the present disclosure, in AC-AP networking, a Control and Provisioning of Wireless Access Points Protocol Specification (CAPWAP) protocol or a Light weight Access Point Protocol (LWAPP) may be used as a communication tunnel protocol between the AC and the AP. As such, the communication tunnel protocol packet as described above may be either a CAPWAP packet or a LWAPP packet, which may be determined based on the communication tunnel protocol employed by the AC-AP networking.

According to an example of the present disclosure, as shown in FIG. 1, AP1 may send a discovery packet to the AC pool. LAC2 to which AP1 is directly connected may receive the discovery packet and redirect the discovery packet to the MAC based on a first traffic rule issued by the MAC. When receiving the discovery packet, the MAC may select, according to any of the aforementioned three methods for determining a handling LAC, a LAC from LAC1, LAC2, and LAC3 as a handling LAC of AP1 (assuming that LAC1 is selected as the handling LAC of AP1). The MAC may generate a second traffic rule associated with AP1 and LAC1, in which the second traffic rule may include an IP address and a port number of AP1 and identifier information of LAC1. The MAC may notify the second traffic rule to LAC1, LAC2, and LAC3. Thereafter, assuming that LAC2 receives a communication tunnel protocol packet sent from AP1, LAC2 may search out the second traffic rule based on a source IP and a source port number of the packet. The LAC2 may determine, based on the identifier information of LAC1 in the second traffic rule, that the handling LAC of AP1 is LAC1. As such, the LAC2 may redirect the communication tunnel protocol packet to LAC1.

As may be seen from the above description that the MAC may notify a second traffic rule associated with an AP and a handling LAC of the AP to all of the LACs in the AC pool. As such, no matter to which LAC in the AC pool the AP is physically connected, traffic from the AP may be redirected to the handling LAC of the AP. According to an example of the present disclosure, a new LAC that joins the AC pool may also need to obtain the second traffic rule. Otherwise, when the new LAC receives a communication tunnel protocol packet from the AP, the new LAC may not redirect the communication tunnel protocol packet to the handling LAC of the AP.

As such, when the MAC receives a packet requesting to join the AC pool which carries information about the new LAC, and determines to allow the new LAC to join the AC pool, the MAC may register the information about the new LAC on the MAC and issue a second traffic rule in the MAC associated with the LACs in the AC pool to the new LAC. In this case, a batch issuing method may be employed to issue the second traffic rule, in which a plurality of second traffic rules may be encapsulated in one data packet and the data packet may be issued to the new LAC. As such, communication pressures between the MAC and the LAC may be reduced and communication efficiency may be improved.

Management Functions of the AC Pool to the STA

According to various examples of the present disclosure, after an AP is handled by a LAC (which may be referred to as a handling LAC of the AP) in the AC pool, a STA associated with the AP may access the handling LAC of the AP through the AP. Traffic to be sent to the STA associated with the AP may be gathered on the handling LAC of the AP and may be forwarded by the handling LAC of the AP to the STA associated with the AP.

In order to gather the traffic to be sent to the STA on the handling LAC of the AP with which the STA is associated, after the STA successfully accesses the handling LAC of the AP with which the STA is associated, the handling LAC of the AP may generate a third traffic rule associated with the STA and the handling LAC of the AP with which the STA is associated. The handling LAC of the AP with which the STA is associated may report the third traffic rule to the MAC, so that the MAC may issue the third traffic rule to all of other LACs in the AC pool. According to an example of the present disclosure, each STA may associated with a third traffic rule, and the number of the third traffic rules may be equal to the total number of the STAs supported by the AC pool. The third traffic rule may redirect a data packet to be sent to the STA to the handling LAC of the AP with which the STA is associated. The third traffic rule may include address information of the STA and identifier information about the handling LAC, in which the address information of the STA may include an IP address and/or a MAC address of the STA. When another LAC in the AC pool receives a data packet to be sent to the STA, the other LAC may search out the third traffic rule based on information about a destination address of the data packet. Then, the other LAC may redirect the data packet to the handling LAC of the AP with which the STA is associated (i.e., the LAC which the STA accesses). In this case, the information about the destination address of the data packet may correspond to the address information of the STA in the third traffic rule, including a destination IP address and/or a destination MAC address of the data packet.

Still taking FIG. 1 as an example, after AP1 is handled by LAC1, STA1 associated with AP1 may access LAC1 through AP1. LAC1 may generate a third traffic rule associated with STA1 and LAC1, and report the third traffic rule to the MAC. The third traffic rule may include address information of STA1 and identifier information of LAC1. After receiving the third traffic rule reported by LAC1, the MAC may issue the third traffic rule to LAC2 and LAC3. As such, when LAC2 or LAC3 receives a data packet from the internet and searches out the third traffic rule based on information about a destination address of the data packet, LAC2 or LAC3 may determine that the data packet is to be sent to STA1, and may redirect the data packet to LAC1 based on the third traffic rule.

As may be seen from the above description that the MAC may notify a third traffic rule associated with a STA and a handling LAC of an AP with which the STA is associated to all of other LACs in the AC pool. As such, a data packet to be sent to the STA may be redirected to the handling LAC of the AP with which the STA is associated. According to an example of the present disclosure, a new LAC that joins the AC pool may also need to obtain the third traffic rule. Otherwise, when the new LAC receives a data packet to be sent to the STA, the new LAC may not redirect the data packet to the handling LAC of the AP with which the STA is associated.

As such, when the MAC receives a packet requesting to join the AC pool which carries information about the new LAC and determines to allow the new LAC to join the AC pool, the MAC may register the information about the new LAC in the MAC and issue a third traffic rule in the MAC associated with LACs in the AC pool to the new LAC. In this case, a batch issuing method may be employed to issue the third traffic rule, in which a plurality of third traffic rules may be encapsulated in one data packet and the data packet may be issued to the new LAC. As such, communication pressures between the MAC and the LAC may be reduced and communication efficiency may be improved.

Disaster Backup

In practice, disaster backup may be performed to avoid termination of a service caused by a failed device. According to an example of the present disclosure, the disaster backup may be performed to the MAC and the LAC in the AC pool.

Disaster Backup for the MAC

When the MAC in the AC pool fails, management of the MAC to the LACs in the AC pool may be ceased. As such, a new LAC may not join the AC pool, and a new AP and a new STA may not access the AC pool, either.

According to an example of the present disclosure, one or more than one backup MACs may be configured for the MAC in the AC pool. The MAC may back up data information of the MAC on all of the backup MACs in real time, and may exchange a heartbeat detection protocol packet with each backup MAC. When the backup MAC detects that the MAC has failed during the process of exchanging the heartbeat detection protocol packet, a backup MAC may be selected, by means of election, from all of the backup MACs to replace the original MAC. For example, the election may be performed according to a principle in which a backup MAC having a minimum MAC address may be selected. The elected backup MAC may issue a first traffic rule to all of the LACs in the AC pool, in which the first traffic rule may redirect a discovery packet sent from an AP to the elected backup MAC. The MAC information in the AC pool basic information packet sent periodically may also be changed to information about the elected backup MAC. Other traffic rules backed up from the original MAC may not be changed, such as all of the second traffic rules and all of the third traffic rules.

Disaster Backup for the LAC

When a LAC in the AC pool fails, traffic of an AP and a STA that have accessed the LAC may be interrupted.

According to an example of the present disclosure, after a LAC is registered on the MAC, the MAC may assign one or more than one backup LACs for the LAC. The MAC may notify identifier information about the one or more than one backup LACs to the LAC. As such, the LAC may detect, based on the identifier information about the one or more than one backup LACs, all of the backup MACs assigned by the MAC for the LAC. Therefore, the LAC may back up information about all of APs and STAs that access the LAC on all of the backup LACs in real time.

The MAC may perform fault detection to all of the LACs in the AC pool. When detecting that a LAC has failed, the MAC may select, from all of backup LACs of the failed LAC, a backup LAC to replace the failed LAC.

According to an example of the present disclosure, the MAC may perform the fault detection to all of the LACs in the AC pool through exchanging a heartbeat detection protocol packet with each of the LACs in the AC pool. When detecting that a LAC has failed during a process of exchanging the heartbeat detection protocol packet, the MAC may select, from all of backup LACs of the failed LAC, a backup LAC to replace the failed LAC for working. In order to make the selected backup LAC to replace the failed LAC to work normally, the MAC may replace identifier information of the failed LAC in all of second traffic rules and third traffic rules associated with the failed LAC with identifier information of the selected backup LAC. Then, the MAC may re-issue all of the updated second traffic rules and the updated third traffic rules to all of the LACs. Thereafter, a communication tunnel protocol packet sent from an AP handled by the failed LAC may be redirected to the selected backup LAC, and a data packet sent to a STA associated with an AP handled by the failed LAC may also be redirected to the selected backup LAC.

According to another example of the present disclosure, the MAC may perform the fault detection to all of the LACs in the AC pool based on a method described as follows.

All of the LACs may be regarded as ring topology. The MAC may determine a start-point and an end-point of the ring topology, e.g., LAC1 and LACn, respectively.

The MAC may issue a fourth traffic rule to all of the LACs, in which the fourth traffic rule may make a detection packet sent from the MAC be forwarded along the LAC ring topology from the start-point to the end-point. For example, assuming that there are four LACs in the AC pool, e.g., LAC1, LAC2, LAC3, and LAC4, which may form the LAC ring topology. The MAC may determine a start-point and an end-point of the LAC ring topology as LAC1 and LAC4, respectively. The MAC may issue a fourth traffic rule to the four LACs. The fourth traffic rule may configure a forwarding path of a detection packet sent from the MAC, which may be defined as MAC→LAC1→LAC2→LAC3→LAC4→MAC. In other words, the MAC may generate the detection packet and send the detection packet to LAC1, which is the start-point of the LAC ring topology. The detection packet may be forwarded, from LAC1, by all of the LACs in the LAC ring topology. Ultimately, the detection packet may be forwarded to LAC4, which is the end-point of the LAC ring topology. The LAC4 may send the detection packet to the MAC. In this case, the MAC may be directly connected to at least two LACs.

When the MAC receives the detection packet sent from the MAC, the MAC may determine that all of the LACs in the LAC ring topology may work normally. When the MAC does not receive the detection packet sent from the MAC within a period of time, the MAC may determine that one or more than one LACs in the LAC ring topology have failed. To determine which LAC is failed, the MAC may send a broadcast query packet. All of the LACs may return a response packet after receiving the broadcast query packet. When a LAC fails, the failed LAC may not respond to the broadcast query message. As such, the MAC may determine the failed LAC according to the response of the broadcast query packet.

After determining the failed LAC, the MAC may select, from all of backup LACs of the failed LAC, a backup LAC to replace the failed LAC for working. Specific operations may refer to the aforementioned method for performing the fault detection to all of the LACs by the MAC through exchanging the heartbeat detection protocol packet with each of the LACs, which may not be repeated herein.

According to the method as described above, no matter how many LACs are increased, the MAC may send and receive one detection packet within per unit time. Therefore, pressures of the MAC may not be increased with the increasing of the LAC.

Based on the above description, various examples of the present disclosure may provide a method and an apparatus for implementing an AC pool, applied to the MAC, and also provide a method and an apparatus for implementing the AC pool, applied to the LAC.

Figure 2:
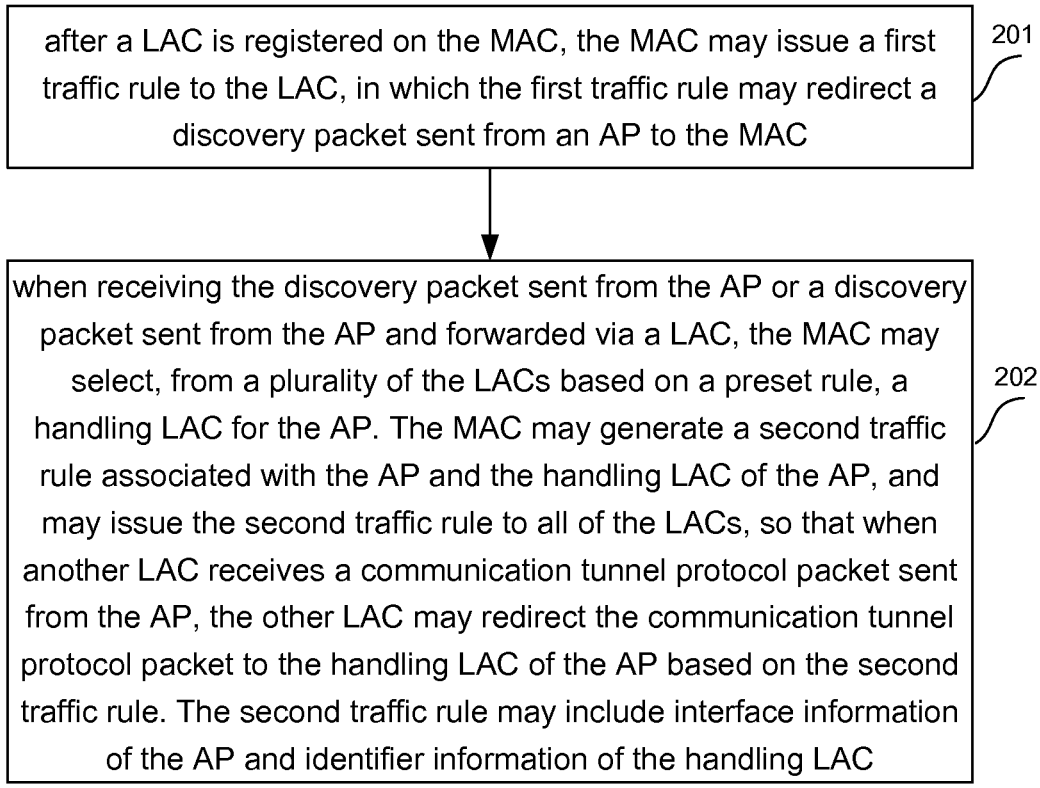
FIG. 2 is a flowchart illustrating a method for implementing an AC pool, according to an example of the present disclosure.

FIG. 2 is a flowchart illustrating a method for implementing an AC pool, according to an example of the present disclosure. The AC pool may include a MAC and a plurality of LACs that are registered on the MAC. The MAC and a plurality of the LACs may share a same IP address. A plurality of the LACs may be connected to each other. At least one LAC may be directly connected to the MAC. The method may be applied to the MAC and include the following operations.

In block 201, after a LAC is registered on the MAC, the MAC may issue a first traffic rule to the LAC, in which the first traffic rule may redirect a discovery packet sent from an AP to the MAC.

In block 202, when receiving the discovery packet sent from the AP or a discovery packet sent from the AP and forwarded via a LAC, the MAC may select, based on a preset rule, a LAC from a plurality of the LACs to handle the AP (in the example, the selected LAC may be referred to as a handling LAC of the AP). The MAC may generate a second traffic rule associated with the AP and the handling LAC of the AP, and may issue the second traffic rule to all of the LACs. As such, when another LAC receives a communication tunnel protocol packet sent from the AP, the other LAC may redirect the communication tunnel protocol packet to the handling LAC of the AP based on the second traffic rule. In this case, the second traffic rule may include interface information of the AP and identifier information of the handling LAC, in which the interface information of the AP may include an IP address and a port number of the AP, and the identifier information of the handling LAC may be identified by a MAC address of the handling LAC.

According to an example of the present disclosure, the method may further include pre-configuring a hotspot for the AP. The operation of selecting a LAC from a plurality of the LACs as the handling LAC of the AP may be implemented as follows. According to an example, when there is another AP that accesses the AC pool and belongs to the hotspot of the AP, the MAC may configure a handling LAC of the other AP as the handling LAC of the AP. According to another example, the MAC may configure a LAC to which the AP is directly connected as the handling LAC of the AP. According to still another example, the MAC may configure a LAC in the AC pool that handles the smallest number of APs as the handling LAC of the AP.

According to an example of the present disclosure, the method may further include the following operations. The MAC may receive a third traffic rule reported by a LAC, in which the third traffic rule is reported by the LAC after a STA successfully accesses the LAC. In this case, the third traffic rule is associated with the STA and the LAC. The MAC may issue the third traffic rule to other LACs in the AC pool, so that when each of other LACs receives a packet to be sent to the STA, each of other LACs may redirect the packet to the LAC based on the third traffic rule. In this case, the third traffic rule may include address information of the STA and identifier information of the LAC. The STA may be associated with an AP handled by the LAC.

According to an example of the present disclosure, the method may further include the following operations. The MAC may assign at least one backup LAC for each LAC registered on the MAC. The MAC may notify identifier information of the at least one backup LAC to the LAC. As such, the LAC may back up information about APs and STAs successfully accessing the LAC on the at least one backup LAC in real time.

According to an example of the present disclosure, the method may further include the following operations. The MAC may exchange a heartbeat detection protocol packet with each LAC registered on the MAC. When determining that a LAC fails based on the exchanging of the heartbeat detection protocol packet, the MAC may select a backup LAC from at least one backup LAC assigned for the failed LAC to replace the failed LAC for working. The MAC may replace identifier information of the failed LAC in all of second traffic rules and third traffic rules associated with the failed LAC with identifier information of the selected backup LAC. The MAC may issue all of the updated second traffic rules and the updated third traffic rules to all of the LACs in the AC pool.

According to an example of the present disclosure, the method may further include the following operations. The MAC may determine a start-point LAC and an end-point LAC of LAC ring topology formed by all of the LACs. The MAC may issue a fourth traffic rule to all of the LACs, in which a detection packet sent from the MAC may be forwarded, based on the fourth traffic rule, along the LAC ring topology from the start-point LAC to the end-point LAC, and may be reported to the MAC by the end-point LAC. When the MAC receives the detection packet sent from the MAC, the MAC may determine that all of the LACs in the LAC ring topology may work normally. When the MAC does not receive the detection packet sent from the MAC within a period of time, the MAC may send a broadcast query packet to determine a failed LAC. After the failed LAC is determined, the MAC may select, from all of backup LACs of the failed LAC, a backup LAC to replace the failed LAC for working. Specific operations may refer to the aforementioned method for performing the fault detection to all of the LAC by the MAC through exchanging the heartbeat detection protocol packet with each of the LACs, which may not be repeated herein.

According to an example of the present disclosure, the method may further include the following operations. The MAC may periodically broadcast an AC pool basic information packet, so that when receiving the AC pool basic information packet, a new LAC may send a packet requesting to join the AC pool. to the MAC In this case, the AC pool basic information packet may carry information about the AC pool and information about the MAC. When receiving the packet requesting to join the AC pool sent from the new LAC, the MAC may determine, based on a pre-configured allowed-AC list and information about the new LAC carried in the packet requesting to join the AC pool, whether the new LAC is allowed to join the AC pool. In response to a determination that the new LAC is allowed to join the AC pool, the MAC may register the information about the new LAC on the MAC, so that the new LAC may join the AC pool. Otherwise, the MAC may return a reject packet. According to an example of the present disclosure, the allowed-AC list may include information about all of LACs that may be allowed to join the AC pool.

Figure 3:
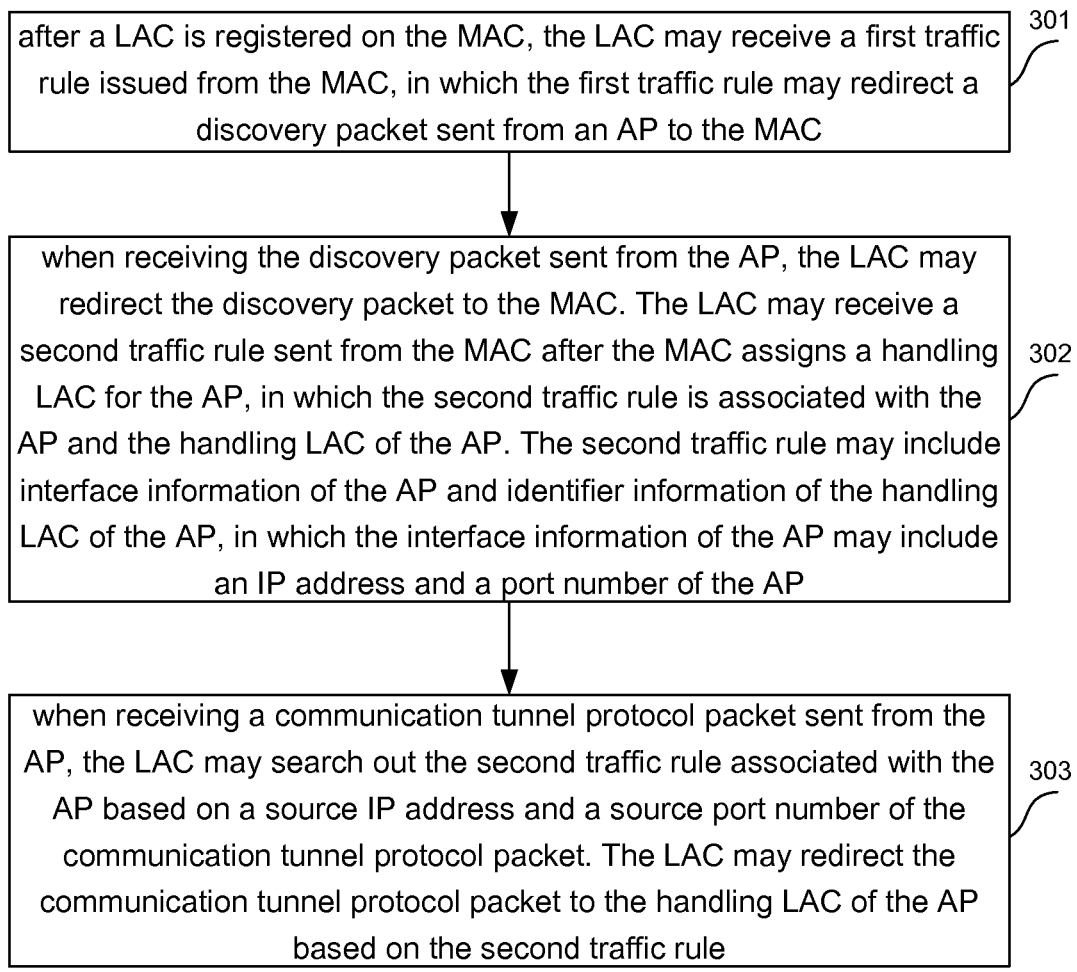
FIG. 3 is a flowchart illustrating a method for implementing an AC pool, according to an example of the present disclosure.

FIG. 3 is a flowchart illustrating a method for implementing an AC pool, according to another example of the present disclosure. The AC pool may include a MAC and a plurality of LACs that are registered on the MAC. The MAC and a plurality of the LACs may share a same IP address. A plurality of the LACs may be connected to each other. At least one LAC may be directly connected to the MAC. The method may be applied to any LAC in a plurality of the LACs and include the following operations.

In block 301, after a LAC is registered on the MAC, the LAC may receive a first traffic rule issued from the MAC, in which the first traffic rule may redirect a discovery packet sent from an AP to the MAC.

In block 302, when receiving the discovery packet sent from the AP, the LAC may redirect the discovery packet to the MAC. The LAC may receive a second traffic rule sent from the MAC after the MAC assigns a handling LAC for the AP, in which the second traffic rule is associated with the AP and the handling LAC of the AP. The second traffic rule may include interface information of the AP and identifier information of the handling LAC of the AP, in which the interface information of the AP may include an IP address and a port number of the AP.

In block 303, when receiving a communication tunnel protocol packet sent from the AP, the LAC may search out the second traffic rule associated with the AP based on a source IP address and a source port number of the communication tunnel protocol packet. The LAC may redirect the communication tunnel protocol packet to the handling LAC of the AP based on the second traffic rule.

According to an example of the present disclosure, the method may further include the following operations. After a STA associated with an AP handled by the LAC successfully accesses the LAC, the LAC may generate a third traffic rule associated with the STA and the LAC. The third traffic rule may include address information of the STA and identifier information of the LAC. The LAC may report the third traffic rule to the MAC, so that the MAC may issue the third traffic rule to all of the LACs. In this case, the address information of the STA may include an IP address and/or a MAC address of the STA.

According to an example of the present disclosure, the method may further include the following operations. The LAC may receive a third traffic rule issued by the MAC and associated with other LACs in the AC pool. When receiving a data packet to be sent to a STA, the LAC may search out a third traffic rule associated with the STA based on information about a destination address of the data packet. The LAC may redirect, based on the third traffic rule associated with the STA, the data packet to a handling LAC of an AP with which the STA is associated. In this case, the information about the destination address of the data packet may include a destination IP address and/or a destination MAC address of the data packet.

According to an example of the present disclosure, the method may further include the following operations. The LAC may receive identifier information about at least one backup LAC of the LAC notified by the MAC, in which the at least one backup LAC may be assigned by the MAC for the LAC after the LAC is registered on the MAC. The LAC may back up information about all of APs and STAs that successfully access the LAC on the at least one backup LAC in real time.

Figure 4A:
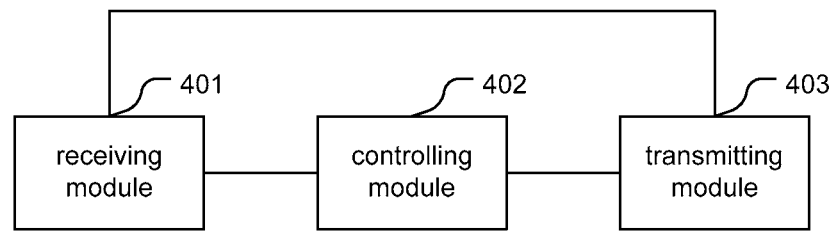
FIG. 4a is a schematic diagram illustrating a structure of an apparatus for implementing an AC pool, according to an example of the present disclosure.

FIG. 4a is a schematic diagram illustrating a structure of an apparatus for implementing an AC pool, according to an example of the present disclosure. The AC pool may include a MAC and a plurality of LACs that are registered on the MAC. The MAC and a plurality of the LACs may share a same IP address. A plurality of the LACs may be connected to each other. At least one LAC may be directly connected to the MAC. The apparatus may be applied to the MAC. As shown in FIG. 4a, the apparatus may include a receiving module 401, a controlling module 402, and a transmitting module 403.

The receiving module 401 may receive a discovery packet sent from an AP or a discovery packet that is sent from the AP and forwarded via a LAC.

When the receiving module 401 receives the discovery packet sent from the AP or the discovery packet that is sent from the AP and forwarded via the LAC, the controlling module 402 may select, based on a preset rule, a LAC from a plurality of the LACs as a handling LAC of the AP. The controlling module 402 may generate a second traffic rule associated with the AP and the handling LAC of the AP. The second traffic rule may include interface information of the AP and identifier information of the handling LAC, in which the interface information of the AP may include an IP address and a port number of the AP, and the identifier information of the handling LAC may be identified by a MAC address of the handling LAC.

After a LAC is registered on the MAC, the transmitting module 403 may issue a first traffic rule to the LAC, in which the first traffic rule may redirect a discovery packet sent from an AP to the MAC. The transmitting module 403 may further issue the second traffic rule associated with the AP and the handling LAC of the AP to all of the LACs in the AC pool. As such, when another LAC receives a communication tunnel protocol packet sent from the AP, the other LAC may redirect the communication tunnel protocol packet to the handling LAC of the AP.

Figure 4B:
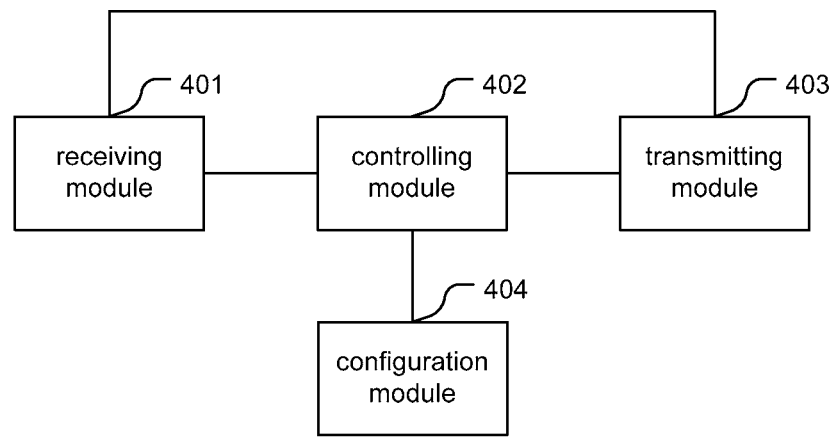
FIG. 4b is a schematic diagram illustrating a structure of an apparatus for implementing an AC pool, according to an example of the present disclosure.

According to an example of the present disclosure, as shown in FIG. 4b, the apparatus may further include a configuration module 404, to pre-configure a hotspot for the AP. In this case, when the controlling module 402 selects, based on the preset rule, a LAC from a plurality of the LACs as the handling LAC of the AP, when there is another AP that accesses the AC pool and belongs to the hotspot of the AP, the controlling module 402 may configure a handling LAC of the other AP as the handling LAC of the AP. According to another example, the controlling module 402 may configure a LAC to which the AP is directly connected as the handling LAC of the AP. According to still another example, the controlling module 402 may configure a LAC in the AC pool that handles the smallest number of APs as the handling LAC of the AP.

According to an example of the present disclosure, the receiving module 401 may further receive a third traffic rule reported by a LAC, in which the third traffic rule is reported by the LAC after a STA successfully accesses the LAC. In this case, the third traffic rule is associated with the STA and the LAC. The third traffic rule may include address information of the STA and identifier information of the LAC. The STA may be associated with an AP handled by the LAC. When the receiving module 401 receives the third traffic rule associated with the STA and the handling LAC of the AP with which the STA is associated, the transmitting module 403 may issue the third traffic rule to other LACs in the AC pool, so that when each of other LACs receives a packet to be sent to the STA, each of other LACs may redirect, based on the third traffic rule, the packet to the handling LAC of the AP with which the STA is associated.

According to an example of the present disclosure, the controlling module 402 may assign one or more than one backup LACs for a LAC registered on the MAC. The transmitting module 403 may notify identifier information of the one or more than one backup LACs to the LAC. As such, the LAC may back up information about all of APs and STAs successfully accessing the LAC on the one or more than one backup LACs in real time.

Figure 4C:
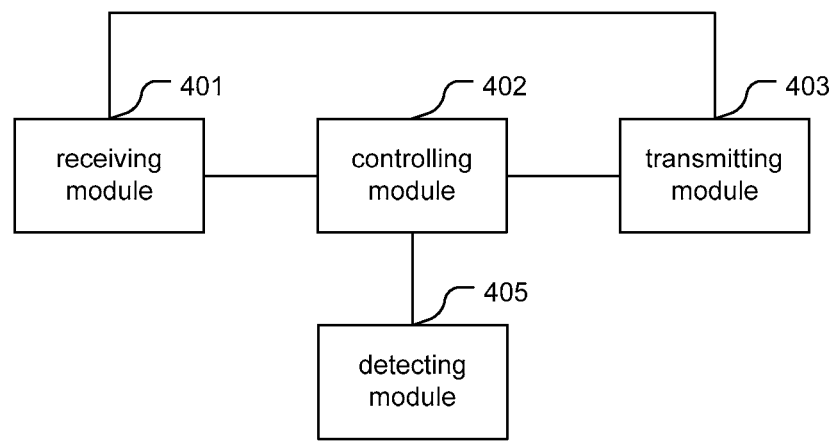
FIG. 4c is a schematic diagram illustrating a structure of an apparatus for implementing an AC pool, according to an example of the present disclosure.

According to an example of the present disclosure, as shown in FIG. 4c, the apparatus may further include a detecting module 405. The detecting module 405 may exchange a heartbeat detection protocol packet with each of the LACs registered on the MAC, and may determine whether a LAC fails based on the exchanging of the heartbeat detection protocol packet. When the detecting module 405 determines that a LAC fails, the controlling module 402 may select a backup LAC from all of backup LACs of the failed LAC to replace the failed LAC for working. The controlling module 402 may replace identifier information of the failed LAC in all of second traffic rules and third traffic rules associated with the failed LAC with identifier information of the selected backup LAC. The transmitting module 403 may issue all of the updated second traffic rules and the updated third traffic rules to all of the LACs in the AC pool.

According to an example of the present disclosure, the detecting module 405 may further determine a start-point LAC and an end-point LAC of LAC ring topology formed by all of the LACs. The transmitting module 403 may send a detection packet. The transmitting module 403 may further issue a fourth traffic rule to all of the LACs, in which the detection packet sent from the MAC may be forwarded, based on the fourth traffic rule, along the LAC ring topology from the start-point LAC to the end-point LAC, and may be reported to the MAC by the end-point LAC. When the receiving module 401 receives the detection packet sent from the MAC, the detecting module 405 may determine that all of the LACs in the LAC ring topology may work normally. When the receiving module 401 does not receive the detection packet sent from the MAC within a period of time, the detecting module 405 may notify the transmitting module 403 to send a broadcast query packet to determine a failed LAC. When the detecting module 405 determines the failed LAC, the controlling module 402 may select, from all of backup LACs of the failed LAC, a backup LAC to replace the failed LAC for working. The controlling module 402 may replace identifier information of the failed LAC in all of second traffic rules and third traffic rules associated with the failed LAC with identifier information of the selected backup LAC. The transmitting module 403 may issue all of the updated second traffic rules and the updated third traffic rules to all of the LACs in the AC pool.

According to an example of the present disclosure, the transmitting module 403 may periodically broadcast an AC pool basic information packet, so that when receiving the AC pool basic information packet, a new LAC may send a packet requesting to join the AC pool to the MAC. In this case, the AC pool basic information packet may carry information about the AC pool and information about the MAC. The receiving module 401 may receive the packet requesting to join the AC pool sent from the new LAC. According to a pre-configured allowed-AC list and information about the new LAC carried in the packet requesting to join the AC pool received by the receiving module 401, the controlling module 402 may determine whether the new LAC is allowed to join the AC pool. In response to a determination that the new LAC is allowed to join the AC pool, the controlling module 402 may register the information about the new LAC on the MAC, so that the new LAC may join the AC pool. The controlling module 402 may further notify the transmitting module 403 to issue second traffic rules and third traffic rules in the MAC and associated with the LACs in the AC pool to the new LAC. Otherwise, the controlling module 402 may notify the transmitting module 403 to return a reject packet. According to an example of the present disclosure, the allowed-AC list may include information about all of LACs that may be allowed to join the AC pool.

The above-mentioned modules in the examples of the present disclosure may be deployed either in a centralized or a distributed configuration, and may be either merged into a single module, or further split into a plurality of sub-modules.

These modules may be software (e.g., machine readable instructions stored in a computer readable medium and executable by a processor), hardware (e.g., the processor of an Application Specific Integrated Circuit (ASIC)), or a combination thereof.

Figure 4D:
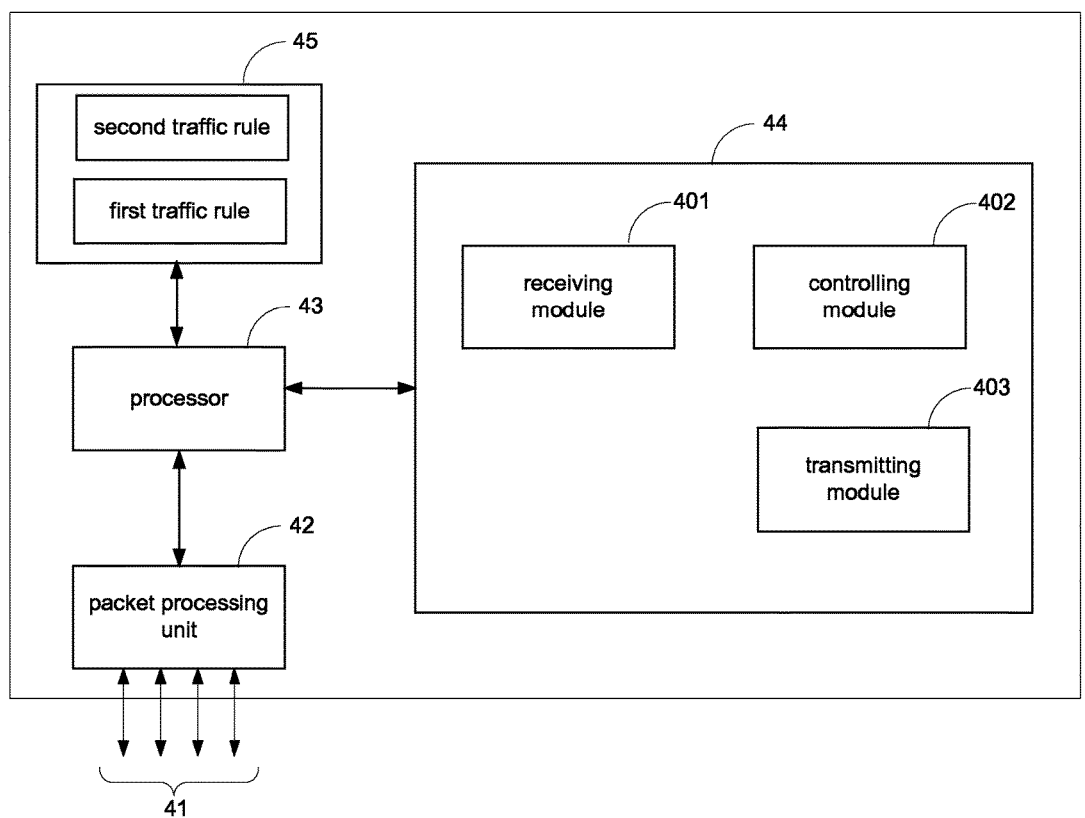
FIG. 4d is a schematic diagram illustrating a hardware structure of an apparatus for implementing an AC pool, according to an example of the present disclosure.

FIG. 4d is a schematic diagram illustrating a hardware structure of an apparatus for implementing an AC pool, according to an example of the present disclosure. The AC pool may include a MAC and a plurality of LACs that are registered on the MAC. The MAC and a plurality of the LACs may share a same IP address. A plurality of the LACs may be connected to each other. At least one LAC may be directly connected to the MAC. The apparatus may be applied to the MAC. As shown in FIG. 4d, the apparatus may include ports 41, a packet processing unit 42, a processor 43, a first storage 44, and a second storage 45. The packet processing unit 42 may transmit packets including data packets and protocol packets received via the ports 41 to the processor 43 for processing, and may transmit data packets and protocol packets from the processor 43 to the ports 41 for forwarding. The second storage 45 may store a first traffic rule. The first storage 44 may store machine-readable instructions. The processor 43 may execute the machine-readable instructions to:

after a first LAC is registered on the MAC, issue the first traffic rule to the first LAC; in which the first traffic rule redirects a discovery packet sent from an access point (AP) to the MAC;

when receiving the discovery packet sent from the AP or receiving a discovery packet sent from the AP and forwarded via a LAC, select, from a plurality of the LACs, a second LAC for handling the AP; and generate a second traffic rule associated with the AP and the second LAC, store the second traffic rule in the second storage 45, and issue the second traffic rule to a plurality of the LACs, so that when another LAC receives a communication tunnel protocol packet sent from the AP, the other LAC redirects the communication tunnel protocol packet to the second LAC, in which the second traffic rule includes interface information of the AP and identifier information of the second LAC.

According to an example of the present disclosure, the processor 43 is to execute the machine-readable instructions to:

pre-configure a hotspot for the AP;

when there is another AP that accesses the AC pool and belongs to the hotspot of the AP, configure a LAC handling the other AP as the second LAC; or configure a LAC to which the AP is directly connected as the second LAC; or configure a LAC handling the smallest number of APs as the second LAC.

According to an example of the present disclosure, the processor 43 is to execute the machine-readable instructions to:

receive a third traffic rule reported by the second LAC, store the third traffic rule in the second storage 45; in which the third traffic rule is generated by the second LAC after a wireless station (STA) associated with the AP successfully accesses the second LAC, and the third traffic rule is associated with the STA and the second LAC; and issue the third traffic rule to other LACs in the AC pool, so that when each of other LACs receives a packet to be sent to the STA, each of other LACs redirects the packet to the second LAC based on the third traffic rule; in which the third traffic rule includes address information of the STA and identifier information of the second LAC.

According to an example of the present disclosure, the processor 43 is to execute the machine-readable instructions to:

assign at least one backup LAC for the first LAC; and notify identifier information of the at least one backup LAC to the first LAC, so that the first LAC backs up information about APs and STAs successfully accessing the first LAC on the at least one backup LAC in real time.

According to an example of the present disclosure, the processor 43 is to execute the machine-readable instructions to:

exchange a heartbeat detection protocol packet with the first LAC;

when determining that the first LAC fails based on the exchanging of the heartbeat detection protocol packet, select a backup LAC from the at least one backup LAC of the first LAC to replace the first LAC, and replace identifier information of the first LAC in all of second traffic rules and third traffic rules associated with the first LAC with identifier information of the selected backup LAC; and issue all of the updated second traffic rules and the updated third traffic rules to a plurality of the LACs in the AC pool.

According to an example of the present disclosure, the processor 43 is to execute the machine-readable instructions to:

periodically broadcast an AC pool basic information packet, so that when receiving the AC pool basic information packet, a new LAC sends a packet requesting to join the AC pool to the MAC; in which the AC pool basic information packet carries information about the AC pool and information about the MAC;

when receiving the packet requesting to join the AC pool sent from the new LAC, determine, based on a pre-configured allowed-AC list and information about the new LAC carried in the packet requesting to join the AC pool, whether the new LAC is allowed to join the AC pool; in which the allowed-AC list includes information about LACs allowed to join the AC pool;

in response to a determination that the new LAC is allowed to join the AC pool, register the information about the new LAC on the MAC, and issue second traffic rules and third traffic rules in the MAC and associated with LACs in the AC pool to the new LAC; otherwise, return a reject packet.

Figure 4E:
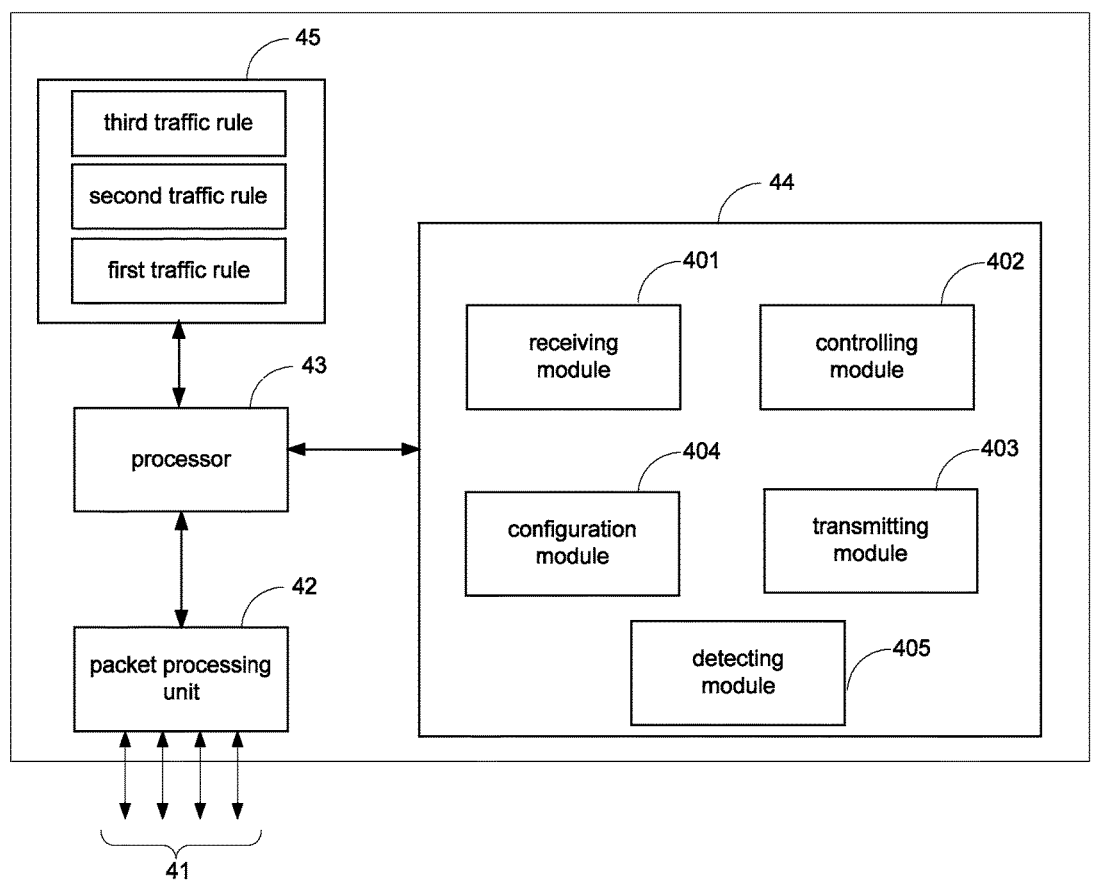
FIG. 4e is a schematic diagram illustrating a hardware structure of an apparatus for implementing an AC pool, according to an example of the present disclosure.

As may be seen from the above description that, when the machine-readable instruction modules stored in the first storage 44 are executed by the processor 43, functions of the aforementioned receiving module 401, the controlling module 402, the transmitting module 403, the configuration module 404, and the detecting module 405 may be achieved. Therefore, an example of the hardware structure of the apparatus for implementing the AC pool is shown in FIG. 4e.

Figure 5A:
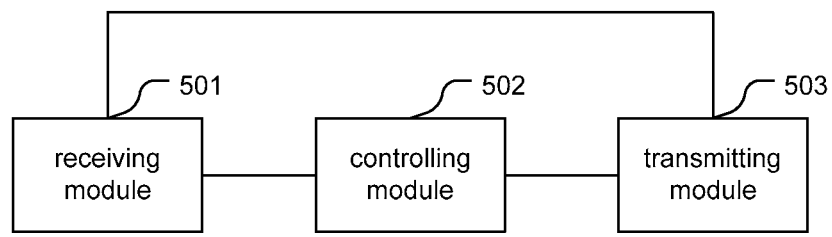
FIG. 5a is a schematic diagram illustrating a structure of an apparatus for implementing an AC pool, according to an example of the present disclosure.

FIG. 5a is a schematic diagram illustrating a structure of an apparatus for implementing an AC pool, according to another example of the present disclosure. The AC pool may include a MAC and a plurality of LACs that are registered on the MAC. The MAC and a plurality of the LACs may share a same IP address. A plurality of the LACs may be connected to each other. At least one LAC may be directly connected to the MAC. The apparatus may be applied to a LAC in a plurality of the LACs. As shown in FIG. 5a, the apparatus may include a receiving module 501, a controlling module 502, and a transmitting module 503.

After the LAC is registered on the MAC, the receiving module 501 may receive a first traffic rule issued from the MAC, in which the first traffic rule may redirect a discovery packet sent from an AP to the MAC. The receiving module 501 may receive the discovery packet sent from the AP and a communication tunnel protocol packet sent from the AP. The receiving module 502 may further receive a second traffic rule sent from the MAC after the MAC assigns a handling LAC for the AP, in which the second traffic rule is associated with the AP and the handling LAC of the AP. The second traffic rule may include interface information of the AP and identifier information of the handling LAC of the AP, in which the interface information of the AP may include an IP address and a port number of the AP.

When the receiving module 501 receives the communication tunnel protocol packet sent from the AP, the controlling module 502 may determine the second traffic rule associated with the AP based on a source IP address and a source port number of the communication tunnel protocol packet.

When the receiving module 501 receives the discovery packet sent from the AP, the transmitting module 503 may redirect the discovery packet to the MAC based on the first traffic rule. When the controlling module 502 determines the second traffic rule associated with the AP based on the source IP address and the source port number of the communication tunnel protocol packet, the transmitting module 503 may redirect the communication tunnel protocol packet to the handling LAC of the AP based on the second traffic rule.

According to an example of the present disclosure, after a STA associated with an AP handled by the LAC successfully accesses the LAC, the controlling module 502 may generate a third traffic rule associated with the STA and the LAC. The third traffic rule may include address information of the STA and identifier information of the LAC. The transmitting module 503 may report the third traffic rule generated by the controlling module 502 to the MAC, so that the MAC may notify the third traffic rule to all of the LACs.

According to an example of the present disclosure, address information of the STA may include an IP address and/or a MAC address of the STA. The receiving module 501 may receive a third traffic rule issued by the MAC and associated with another LAC in the AC pool. The receiving module 501 may further receive a data packet to be sent to a STA. When the receiving module 501 receives the data packet to be sent to the STA, the controlling module 502 may search out a third traffic rule associated with the STA based on information about a destination address of the data packet. When the receiving module 501 receives the data packet to be sent to the STA and the controlling module 502 searches out the third traffic rule associated with the STA based on the information about the destination address of the data packet, the transmitting module 503 may redirect, based on the third traffic rule associated with the STA, the data packet to a handling LAC of an AP with which the STA is associated. In this case, the information about the destination address of the data packet may include a destination IP address and/or a destination MAC address of the data packet.

Figure 5B:
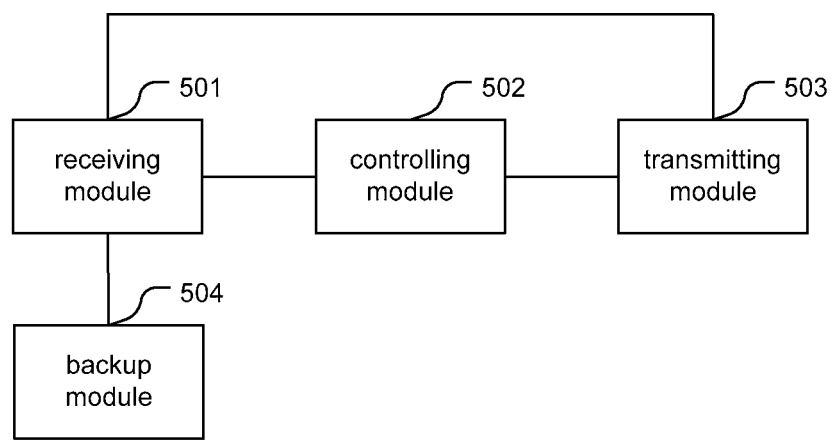
FIG. 5b is a schematic diagram illustrating a structure of an apparatus for implementing an AC pool, according to an example of the present disclosure.

According to an example of the present disclosure, as shown in FIG. 5b, the apparatus may further include a backup module 504. The receiving module 501 may receive identifier information about one or more than one backup LACs of the LAC notified by the MAC, in which the one or more than one backup LACs may be assigned by the MAC for the LAC after the LAC is registered on the MAC. The backup module 504 may back up, based on the identifier information about the one or more than one backup LACs received by the receiving module 501, information about all of APs and STAs that access the LAC on the one or more than one backup LACs of the LAC in real time.

The above-mentioned modules in the examples of the present disclosure may be deployed either in a centralized or a distributed configuration, and may be either merged into a single module, or further split into a plurality of submodules.

These modules may be software (e.g., machine readable instructions stored in a computer readable medium and executable by a processor), hardware (e.g., the processor of an Application Specific Integrated Circuit (ASIC)), or a combination thereof.

Figure 5C:
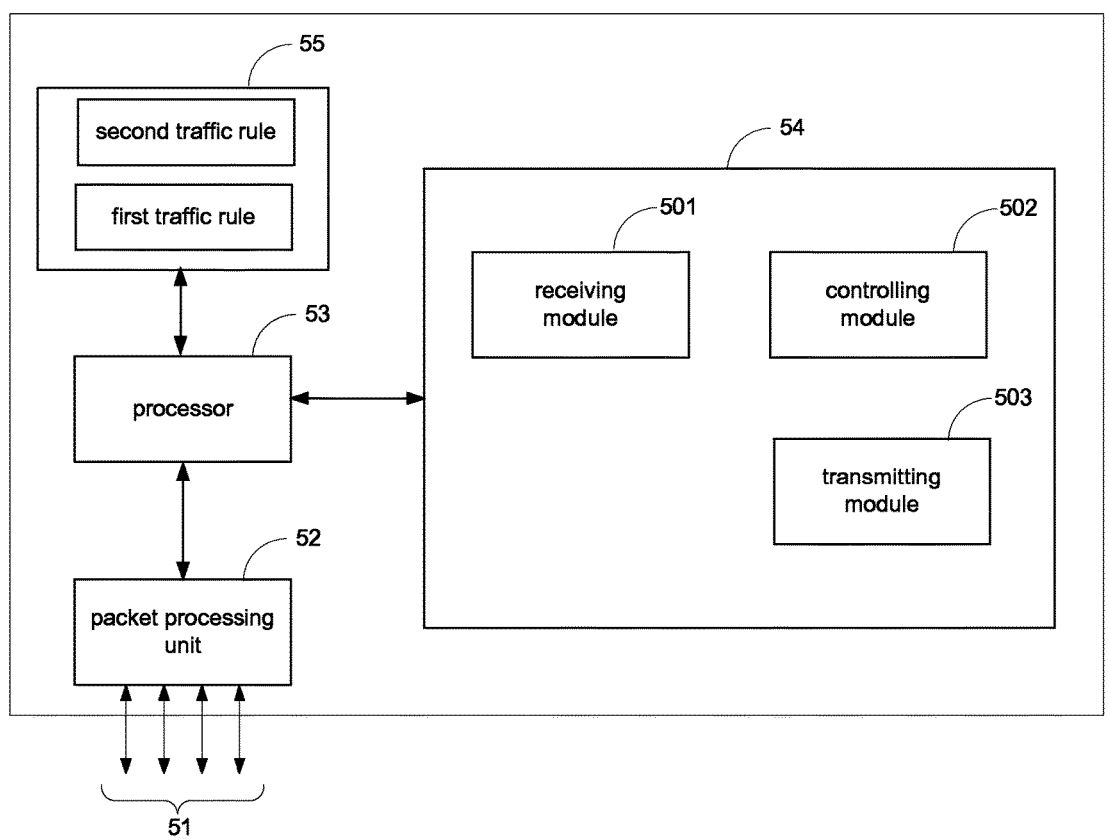
FIG. 5c is a schematic diagram illustrating a hardware structure of an apparatus for implementing an AC pool, according to an example of the present disclosure.

FIG. 5c is a schematic diagram illustrating a hardware structure of an apparatus for implementing an AC pool, according to an example of the present disclosure. The AC pool may include a MAC and a plurality of LACs that are registered on the MAC. The MAC and a plurality of the LACs may share a same IP address. A plurality of the LACs may be connected to each other. At least one LAC may be directly connected to the MAC. The apparatus may be applied to a LAC in a plurality of the LACs. As shown in FIG. 5c, the apparatus may include ports 51, a packet processing unit 52, a processor 53, a first storage 54, and a second storage 55. The packet processing unit 52 may transmit packets including data packets and protocol packets received via the ports 51 to the processor 53 for processing, and may transmit data packets and protocol packets from the processor 53 to the ports 51 for forwarding. The first storage 54 may store machine-readable instructions. The processor 53 may execute the machine-readable instructions to:

after the LAC is registered on the MAC, receive a first traffic rule issued from the MAC, and store the first traffic rule in the second storage 55; in which the first traffic rule redirects a discovery packet sent from an access point (AP) to the MAC;

when receiving the discovery packet sent from the AP, redirect the discovery packet to the MAC based on the first traffic rule; receive a second traffic rule sent from the MAC after the MAC assigns a second LAC for handling the AP, and store the second traffic rule in the second storage 55; in which the second traffic rule is associated with the AP and the second LAC, and includes interface information of the AP and identifier information of the second LAC, in which the interface information of the AP includes an internet protocol (IP) address and a port number of the AP; and when receiving a communication tunnel protocol packet sent from the AP, search out the second traffic rule associated with the AP based on a source IP address and a source port number of the communication tunnel protocol packet; and redirect the communication tunnel protocol packet to the second LAC based on the second traffic rule.

According to an example of the present disclosure, the processor 53 is to execute the machine-readable instructions to:

when a wireless station (STA) associated with an AP handled by the LAC accesses the LAC, generate a third traffic rule associated with the STA and the LAC; in which the third traffic rule includes address information of the STA and identifier information of the LAC; and report the third traffic rule to the MAC, so that the MAC issues the third traffic rule to a plurality of the LACs in the AC pool.

According to an example of the present disclosure, the address information of the STA includes at least one of an IP address and a media access control (MAC) address of the STA. The processor 53 is to execute the machine-readable instructions to:

receive a third traffic rule issued by the MAC and associated with another LAC and a second STA, and store the third traffic rule in the second storage 55; in which the second STA is associated with an AP handled by the other LAC;

when receiving a data packet to be sent to the second STA, search out the third traffic rule associated with the second STA and the other LAC based on information about a destination address of the data packet; and redirect, based on the third traffic rule associated with the second STA and the other LAC, the data packet to the other LAC; in which the information about the destination address of the data packet includes at least one of a destination IP address and a destination MAC address of the data packet.

According to an example of the present disclosure, the processor 53 is to execute the machine-readable instructions to:

receive identifier information about at least one backup LAC of the LAC notified by the MAC; in which the at least one backup LAC is assigned by the MAC for the LAC after the LAC is registered on the MAC; and back up information about APs and STAs that access the LAC on the at least one backup LAC in real time.

Figure 5D:
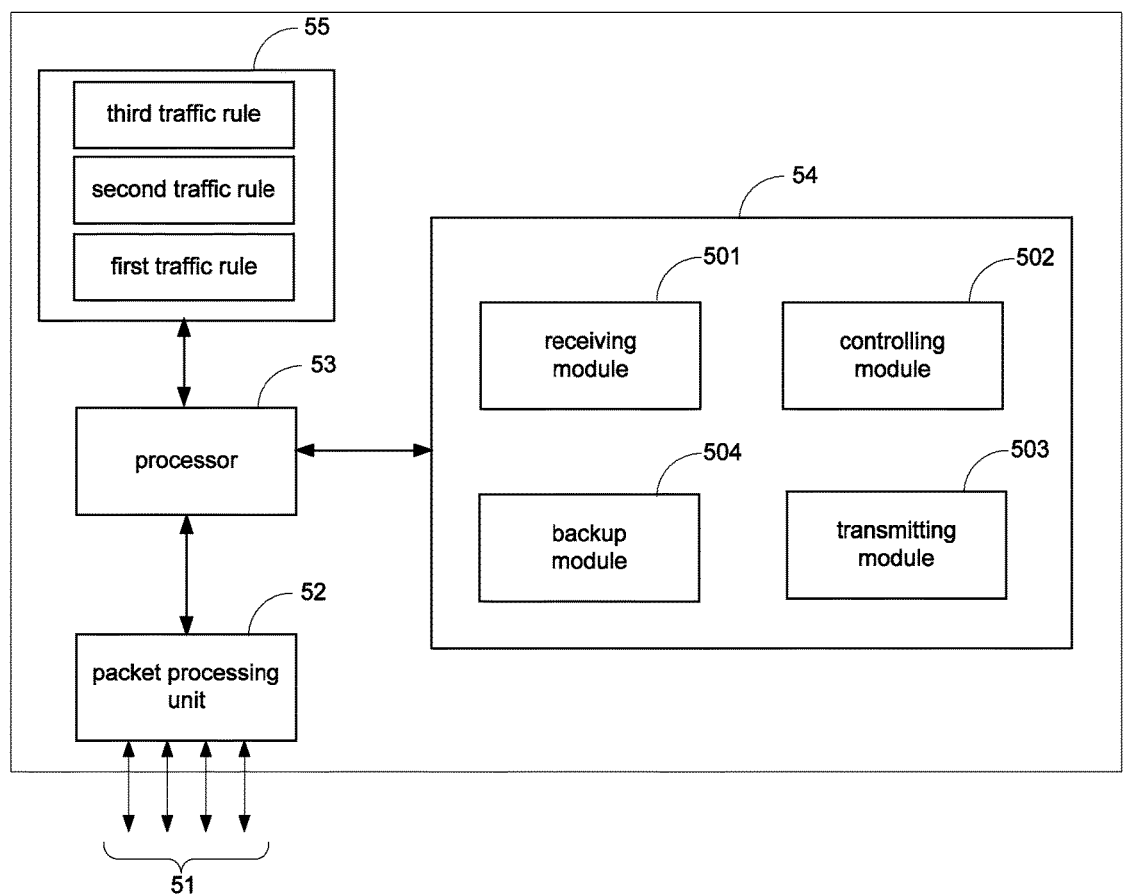
FIG. 5d is a schematic diagram illustrating a hardware structure of an apparatus for implementing an AC pool, according to an example of the present disclosure.

As may be seen from the above description that, when the machine-readable instruction modules stored in the first storage 54 are executed by the processor 53, functions of the aforementioned receiving module 501, the controlling module 502, the transmitting module 503, and the backup module 504 may be achieved. Therefore, an example of the hardware structure of the apparatus for implementing the AC pool is shown in FIG. 5d.

As may be seen from the above description that according to various examples of the present disclosure, a MAC and all of LACs in the AC hierarchy architecture may join an AC pool. The MAC may issue a first traffic rule to all of the LACs, so that each of the LACs may redirect, based on the first traffic rule, a discovery packet from an AP to the MAC for processing. When the MAC receives the discovery packet sent from the AP, the MAC may assign a handling LAC for the AP according to a preset rule. The MAC may generate a second traffic rule associated with the AP and the handling LAC of the AP, and may issue the second traffic rule to all of the LACs in the AC pool. As such, another LAC may redirect, based on the second traffic rule, a communication tunnel protocol packet sent from the AP to the handling LAC of the AP. By this manner, traffic from the AP may be gathered on the handling LAC of the AP and may be forwarded by the handling LAC. When examples of the present disclosure are employed, AC resources may be better used and waste of resources may be reduced.

The above examples may be implemented by hardware, software or firmware, or a combination thereof. For example, the various methods, processes and functional modules described herein may be implemented by a processor (the term processor is to be interpreted broadly to include a CPU, processing unit, ASIC, logic unit, or programmable gate array, etc.). The processes, methods, and functional modules disclosed herein may all be performed by a single processor or split between several processors. In addition, reference in this disclosure or the claims to a 'processor' should thus be interpreted to mean 'one or more processors'. The processes, methods and functional modules disclosed herein may be implemented as machine readable instructions executable by one or more processors, hardware logic circuitry of the one or more processors or a combination thereof. Further the examples disclosed herein may be implemented in the form of a computer software product. The computer software product may be stored in a non-transitory storage medium and may include a plurality of instructions for making a computer apparatus (which may be a personal computer, a server or a network apparatus such as a router, switch, access point, etc.) implement the method recited in the examples of the present disclosure.

All or part of the procedures of the methods of the above examples may be implemented by hardware modules following machine readable instructions. The machine readable instructions may be stored in a computer readable storage medium. When running, the machine readable instructions may provide the procedures of the method examples. The storage medium may be diskette, CD, ROM (Read-Only Memory) or RAM (Random Access Memory), and etc.

The figures are only illustrations of examples, in which the modules or procedures shown in the figures may not be necessarily essential for implementing the present disclosure. The modules in the aforesaid examples may be combined into one module or further divided into a plurality of sub-modules.

The above are several examples of the present disclosure, and are not used for limiting the protection scope of the present disclosure. Any modifications, equivalents, improvements, etc., made under the principle of the present disclosure should be included in the protection scope of the present disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for implementing an access controller (AC) pool, wherein the AC pool comprises a master AC (MAC) and a plurality of local ACs (LACs) registered on the MAC, the method comprising:
    after a first LAC is registered on the MAC, issuing, by the MAC, a first traffic rule to the first LAC;
        wherein the first traffic rule redirects a discovery packet sent from an access point (AP) to the MAC;
    when receiving the discovery packet sent from the AP or receiving a discovery packet sent from the AP and forwarded via a LAC, selecting, by the MAC from the plurality of the LACs, a second LAC for handling the AP; and
    generating, by the MAC, a second traffic rule associated with the AP and the second LAC, and issuing the second traffic rule to the plurality of the LACs, so that when another LAC receives a communication tunnel protocol packet sent from the AP, the other LAC redirects the communication tunnel protocol packet to the second LAC;
        wherein the second traffic rule comprises interface information of the AP and identifier information of the second LAC.

2. The method of claim 1, further comprising:
    pre-configuring a hotspot for the AP;
        wherein the operation of selecting, from the plurality of the LACs, the second LAC for handling the AP comprises:
            when there is another AP that accesses the AC pool and belongs to the hotspot of the AP, configuring, by the MAC, a LAC handling the other AP as the second LAC; or
            configuring, by the MAC, a LAC to which the AP is directly connected as the second LAC; or
            configuring, by the MAC, a LAC handling the smallest number of APs as the second LAC.

3. The method of claim 1, further comprising:
    receiving, by the MAC, a third traffic rule reported by the second LAC;
        wherein the third traffic rule is generated by the second LAC after a wireless station (STA) associated with the AP successfully accesses the second LAC, and the third traffic rule is associated with the STA and the second LAC; and
    issuing, by the MAC, the third traffic rule to other LACs in the AC pool, so that when each of the other LACs receives a packet to be sent to the STA, each of the other LACs redirects the packet to the second LAC based on the third traffic rule;
        wherein the third traffic rule comprises address information of the STA and identifier information of the second LAC.

4. The method of claim 1, further comprising:
    assigning, by the MAC, at least one backup LAC for the first LAC;
    notifying, by the MAC, identifier information of the at least one backup LAC to the first LAC, so that the first LAC backs up information about APs and STAs successfully accessing the first LAC on the at least one backup LAC in real time.

5. The method of claim 1, further comprising:
    periodically broadcasting, by the MAC, an AC pool basic information packet, so that when receiving the AC pool basic information packet, a new LAC sends a packet requesting to join the AC pool to the MAC;
        wherein the AC pool basic information packet carries information about the AC pool and information about the MAC;
    when receiving the packet requesting to join the AC pool sent from the new LAC, determining, by the MAC based on a pre-configured allowed-AC list and information about the new LAC carried in the packet requesting to join the AC pool, whether the new LAC is allowed to join the AC pool;
        wherein the allowed-AC list comprises information about LACs allowed to join the AC pool;
    in response to a determination that the new LAC is allowed to join the AC pool, registering the information about the new LAC on the MAC, and issuing second traffic rules and third traffic rules in the MAC and associated with LACs in the AC pool to the new LAC; otherwise,
    returning a reject packet.

6. A method for implementing an access controller (AC) pool, wherein the AC pool comprises a master AC (MAC) and a plurality of local ACs (LACs) registered on the MAC, the method comprising:
    after a LAC is registered on the MAC, receiving, by the LAC, a first traffic rule issued from the MAC;
        wherein the first traffic rule redirects a discovery packet sent from an access point (AP) to the MAC;
    when receiving the discovery packet sent from the AP, redirecting, by the LAC, the discovery packet to the MAC based on the first traffic rule; and receiving a second traffic rule sent from the MAC after the MAC assigns a second LAC for handling the AP;
        wherein the second traffic rule is associated with the AP and the second LAC, and comprises interface information of the AP and identifier information of the second LAC, wherein the interface information of the AP comprises an internet protocol (IP) address and a port number of the AP; and
    when receiving a communication tunnel protocol packet sent from the AP, searching out, by the LAC, the second traffic rule associated with the AP based on a source IP address and a source port number of the communication tunnel protocol packet; and redirecting the communication tunnel protocol packet to the second LAC based on the second traffic rule.

7. The method of claim 6, further comprising:
    when a wireless station (STA) associated with an AP handled by the LAC accesses the LAC, generating, by the LAC, a third traffic rule associated with the STA and the LAC;

wherein the third traffic rule comprises address information of the STA and identifier information of the LAC; and reporting, by the LAC, the third traffic rule to the MAC, so that the MAC issues the third traffic rule to a plurality of the LACs in the AC pool.

8. The method of claim 6, wherein
the address information of the STA comprises at least one of an IP address and a media access control (MAC) address of the STA;
the method further comprises:
  receiving, by the LAC, a third traffic rule issued by the MAC and associated with another LAC and a second STA;
  wherein the second STA is associated with an AP handled by the other LAC;
  when receiving a data packet to be sent to the second STA, searching out, by the LAC, the third traffic rule associated with the second STA and the other LAC based on information about a destination address of the data packet; and
  redirecting, by the LAC based on the third traffic rule associated with the second STA and the other LAC, the data packet to the other LAC;
wherein the information about the destination address of the data packet comprises at least one of a destination IP address and a destination MAC address of the data packet.

9. An apparatus for implementing an access controller (AC) pool, wherein the AC pool comprises a master AC (MAC) and a plurality of local ACs (LACs) registered on the MAC, the apparatus comprising:
  a first storage, to store machine-readable instructions;
  a second storage, to store a first traffic rule; and
  a processor, to execute the machine-readable instructions to:
    after a first LAC is registered on the MAC, issue the first traffic rule to the first LAC;
    wherein the first traffic rule redirects a discovery packet sent from an access point (AP) to the MAC;
    when receiving the discovery packet sent from the AP or receiving a discovery packet sent from the AP and forwarded via a LAC, select, from a plurality of the LACs, a second LAC for handling the AP; and
    generate a second traffic rule associated with the AP and the second LAC, store the second traffic rule in the second storage, and issue the second traffic rule to a plurality of the LACs, so that when another LAC receives a communication tunnel protocol packet sent from the AP, the other LAC redirects the communication tunnel protocol packet to the second LAC;
  wherein the second traffic rule comprises interface information of the AP and identifier information of the second LAC.

10. The apparatus of claim 9, wherein the processor is to execute the machine-readable instructions to:
  pre-configure a hotspot for the AP;
  when there is another AP that accesses the AC pool and belongs to the hotspot of the AP, configure a LAC handling the other AP as the second LAC; or
  configure a LAC to which the AP is directly connected as the second LAC; or
  configure a LAC handling the smallest number of APs as the second LAC.

11. The apparatus of claim 9, wherein the processor is to execute the machine-readable instructions to:

receive a third traffic rule reported by the second LAC, and store the third traffic rule in the second storage;
wherein the third traffic rule is generated by the second LAC after a wireless station (STA) associated with the AP successfully accesses the second LAC, and the third traffic rule is associated with the STA and the second LAC; and
issue the third traffic rule to other LACs in the AC pool, so that when each of the other LACs receives a packet to be sent to the STA, each of the other LACs redirects the packet to the second LAC based on the third traffic rule;
wherein the third traffic rule comprises address information of the STA and identifier information of the second LAC.

12. The apparatus of claim 9, wherein the processor is to execute the machine-readable instructions to:
  in response to determining that the first LAC has failed, select a backup LAC to replace the first LAC, and replace identifier information of the first LAC in the second traffic rule associated with the first LAC with identifier information of the selected backup LAC; and
  issue the second traffic rule to a plurality of the LACs in the AC pool.

13. An apparatus for implementing an access controller (AC) pool, wherein the AC pool comprises a master AC (MAC) and a plurality of local ACs (LACs) registered on the MAC, the apparatus comprising:
  a first storage, to store machine-readable instructions;
  a processor, to execute the machine-readable instructions to:
    after a LAC is registered on the MAC, receive a first traffic rule issued from the MAC, and store the first traffic rule in a second storage;
      wherein the first traffic rule redirects a discovery packet sent from an access point (AP) to the MAC;
    when receiving the discovery packet sent from the AP, redirect the discovery packet to the MAC based on the first traffic rule; receive a second traffic rule sent from the MAC after the MAC assigns a second LAC for handling the AP, and store the second traffic rule in the second storage;
      wherein the second traffic rule is associated with the AP and the second LAC, and comprises interface information of the AP and identifier information of the second LAC, wherein the interface information of the AP comprises an internet protocol (IP) address and a port number of the AP; and
    when receiving a communication tunnel protocol packet sent from the AP, search out the second traffic rule associated with the AP based on a source IP address and a source port number of the communication tunnel protocol packet; and redirect the communication tunnel protocol packet to the second LAC based on the second traffic rule.

14. The apparatus of claim 13, wherein the processor is to execute the machine-readable instructions to:
  when a wireless station (STA) associated with an AP handled by the LAC accesses the LAC, generate a third traffic rule associated with the STA and the LAC;
  wherein the third traffic rule comprises address information of the STA and identifier information of the LAC; and
  report the third traffic rule to the MAC, so that the MAC issues the third traffic rule to a plurality of the LACs in the AC pool.

15. The apparatus of claim 13, wherein
the address information of the STA comprises at least one of an IP address and a media access control (MAC) address of the STA;
the processor is to execute the machine-readable instructions to:
  receive a third traffic rule issued by the MAC and associated with another LAC and a second STA, and store the third traffic rule in the second storage; wherein the second STA is associated with an AP handled by the other LAC;
  when receiving a data packet to be sent to the second STA, search out the third traffic rule associated with the second STA and the other LAC based on information about a destination address of the data packet; and
  redirect, based on the third traffic rule associated with the second STA and the other LAC, the data packet to the other LAC;
wherein the information about the destination address of the data packet comprises at least one of a destination IP address and a destination MAC address of the data packet.

16. The method of claim 1, wherein the interface information of the AP comprises an internet protocol (IP) address and a port number of the AP.

17. The method of claim 3, wherein the address information of the STA comprises at least one of an IP address and a media access control (MAC) address of the STA.

18. The method of claim 6, comprising:
  receiving, by the LAC prior to registering on the MAC, an AC pool basic information packet; and
  responsive to receiving the AC pool basic information packet, sending, by the LAC, a packet requesting to join the AC pool to the MAC.

19. The method of claim 18, wherein the AC pool basic information packet carries information about the AC pool and information about the MAC.

20. The method of claim 6, comprising:
  storing, by the LAC, the first traffic rule and the second traffic rule in a first storage.

* * * * *